United States Patent [19]

Crano

[11] 4,213,948
[45] Jul. 22, 1980

[54] PREPARATION OF BORON TRICHLORIDE

[75] Inventor: John C. Crano, Akron, Ohio

[73] Assignee: PPG Industries, Inc., Pittsburgh, Pa.

[21] Appl. No.: 43,292

[22] Filed: May 29, 1979

[51] Int. Cl.$^2$ .............................................. C01B 35/06
[52] U.S. Cl. ................................................... 423/292
[58] Field of Search ........................................ 423/292

[56] References Cited

U.S. PATENT DOCUMENTS 2,943,916   7/1960   McElroy et al. ..................... 423/292

Primary Examiner—G. O. Peters
Attorney, Agent, or Firm—Irwin M. Stein

[57] ABSTRACT

Boron trichloride is prepared by free-radical chlorination of liquid borate ester, e.g., trimethyl borate, at temperatures of between about 20° C. and 100° C. Color bodies which form and accumulate in the liquid reaction mixture are removed by extracting a purge fraction of the reaction mixture from the reactor, distilling such liquid reaction mixture, and recycling distillate obtained from the distillation to the reactor. The volume of the purge fraction can vary between about 4 and about 20 volume percent of the reaction mixture per hour. Borate ester can be added to the distillate before introducing it into the reactor.

18 Claims, 1 Drawing Figure

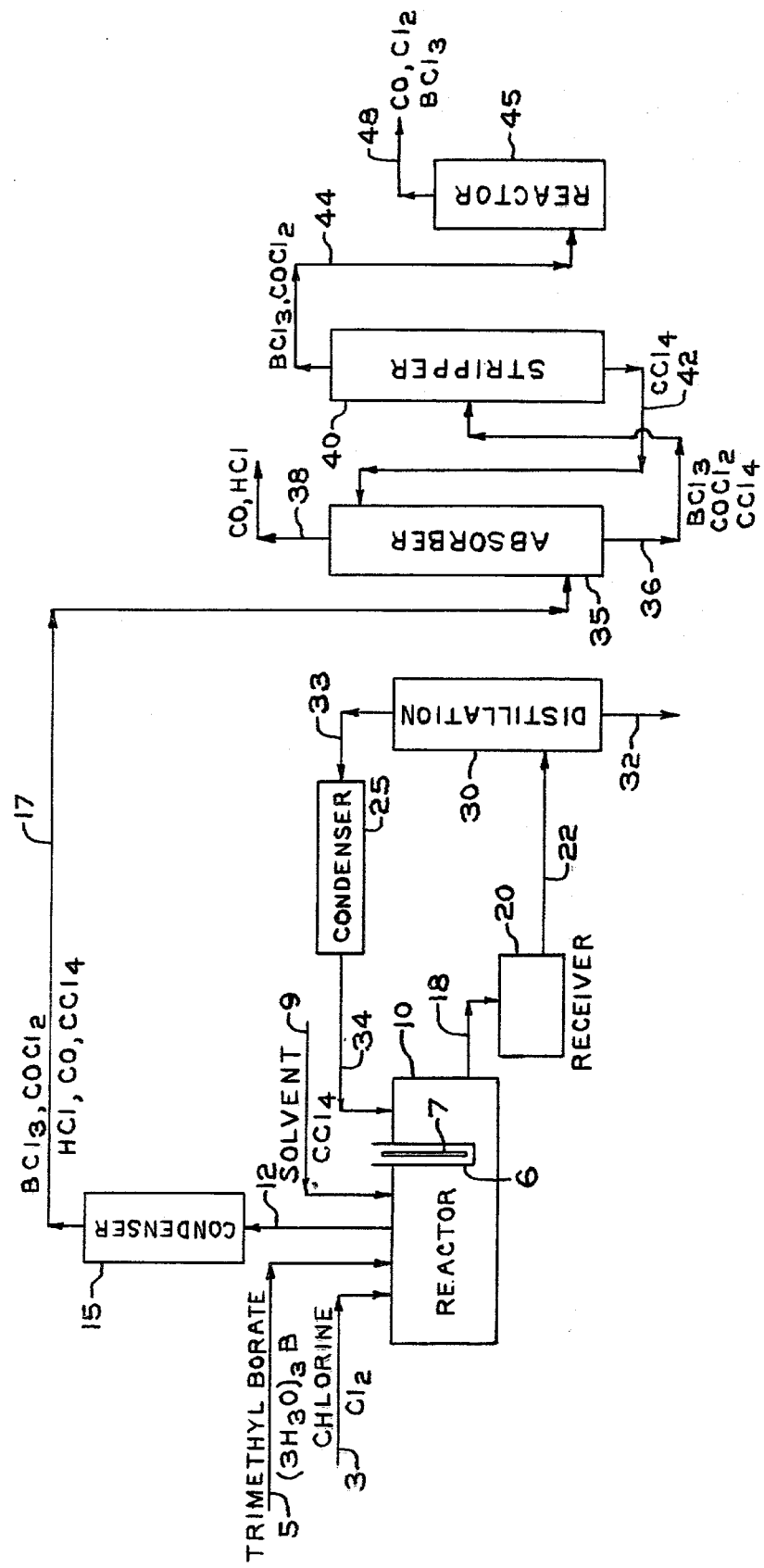

PREPARATION OF BORON TRICHLORIDE

DESCRIPTION OF THE INVENTION

Boron trichloride is a compound that has many reported industrial uses. For example, its utility as an intermediate for the production of other boron containing compounds, such as diborane and refractory metal borides, e.g., titanium diboride, is established. It is also used as a refrigerant, as a catalyst and in Grignard reactions.

A number of methods have been described in the literature for preparing boron trichloride. One such method involves passing chlorine gas through a reactor containing a mixture of boric oxide and carbon at temperatures of the order of 700–1000° C. This method is characterized by various processing difficulties and corrosion problems because of the use of chlorine at temperatures of 700° C. and above.

The preparation of boron trichloride at room temperature and autogenous pressures by chlorination of trimethyl borate or trimethoxyboroxine has been described in U.S. Pat. 2,943,916. In copending, coassigned U.S. patent application Ser. No. 23,858, filed Mar. 26, 1979, the free-radical chlorination of borate esters, e.g., trimethyl borate, at temperature of from 20° C. to 100° C. and moderate reactor pressures is described. Also described therein are conditions for reducing the amount of phosgene produced when the chlorination reaction is conducted in accordance with U.S. Pat. No. 2,943,916.

It has now been discovered that in the continuous free-radical chlorination of borate ester, color bodies form in the reaction mixture. These color bodies are believed to be boron-containing compounds which are produced during the chlorination reaction. As the reaction proceeds, the concentration of the color bodies in the reaction mixture increases and thereby reduces the effectiveness of the free-radical initiator. This problem is especially troublesome when the free-radical initiator is light because the color bodies prevent light energy from the light source from reaching the light-activated reactant. The problems associated with the formation of color bodies in the reaction mixture is not as acute when chemical free-radical initiators, e.g. organic peroxy compounds, are used; however, it is expected that the color bodies also interfere with the efficiency of chemical initiators also.

It has also been discovered that color bodies formed in the reaction mixture can be removed by distillation. In accordance with the present invention, a fraction of the reaction mixture is removed as a purge stream from the reactor, and forwarded to a distillation zone where it is distilled. The distillate resulting from the aforesaid distillation is recycled to the reactor. The color bodies present in the feed to the distillation zone are removed continuously or periodically from the distillation zone as bottoms. The present invention permits the continuous free-radical chlorination of borate esters to boron trichloride without the need for interrupting the reaction to remove color body impurities which form and accumulate in the reaction mixture.

BRIEF DESCRIPTION OF THE DRAWING

The present invention will be understood more readily by reference to the accompanying drawing which is a diagrammatic illustration of an embodiment of the present invention.

DETAILED DESCRIPTION

Referring now to the attached drawing there is shown reactor 10 for conducting the chlorination reaction. Reactants borate ester (trimethyl borate) and chlorine are introduced into the reactor by means of feed lines 5 and 3 respectively. The chlorine reactant is preferably introduced below the level of the liquid in the reactor, e.g., by means of a sparger, to provide agitation of and contact between the reactants. When introduced in this manner, the chlorine is absorbed readily in the reaction medium. Solvent (carbon tetrachloride) is introduced into reactor 10 through feed line 9. A source of light 7, e.g., ultraviolet light, within transparent container 6 is shown within reactor 10. A chemical free-radical initiator, the nature of which is discussed hereinafter, can be used in place of the light source.

Typically, borate ester and solvent (if used) are introduced into the reactor to form the reaction medium. Thereafter, free-radical initiator (light or chemical initiator) and chlorine are introduced into the reactor. In a continuous reaction, the reactants are metered continuously into the reactor. After an initial induction period, e.g., less than about five minutes, the chlorination reaction proceeds rapidly with substantial consumption of the chlorine reactant as it is added. The gaseous products of the reaction, e.g., hydrogen chloride, carbon monoxide, phosgene and boron trichloride, are removed continuously from the reactor together with solvent, e.g., carbon tetrachloride, through flow line 12. This gaseous product effluent is forwarded to reflux condenser 15 wherein solvent and partially chlorinated borate ester intermediates are condensed. Condensate from condenser 15 is returned to reactor 10, where it assists in regulating the reactor temperature. Partially chlorinated borate ester intermediates in the condensate are further chlorinated thereby. The gaseous effluent from condenser 15 is forwarded by flow line 17 to absorber 35 where it is contacted with solvent, e.g., carbon tetrachloride, introduced thereto by means of flow line 42. Boron trichloride and phosgene are absorbed in the solvent and removed through flow line 36 to stripper 40. Carbon monoxide and hydrogen chloride not absorbed in the solvent are removed from absorber 20 through flow line 38. These gases (CO and HCl) can be separated and recovered or destroyed, e.g., by burning and neutralization with a base, respectively.

In accordance with the present invention, a purge stream is removed from reactor 10 by flow line 18. The volume of the reaction mixture removed as purge will vary depending on the rate at which color bodies are formed in the reaction mixture. It is expected that the rate of color body formation will increase with temperature and therefore the volume of material removed from the reactor as purge will depend, in part, on the chlorination temperature utilized. The volume of the reactor purge stream should be sufficient to maintain the reaction mixture substantially free of color forming boron containing compounds.

As indicated, the purge fraction of liquid reaction mixture removed from the reactor can vary broadly. Typically the purge fraction removed from the reactor can vary broadly. Typically the purge fraction will vary between about 4 and about 20 volume percent of the reaction mixture per hour, more commonly between about 6 and about 15, e.g., 8 and 12, volume percent of the reaction mixture per hour. The aforesaid purge fractions are calculated to provide a complete cycling of the reaction mixture volume in between about 5 and 24 hours, e.g., every 8 to 12 hours. The cycling of the reaction mixture once in the above-described time periods, avoids the accumulation of color bodies in the reaction mixture.

As shown in the attached drawing, the purge stream is forwarded to holding receiver 20 from where it is forwarded by means of flow line 22 to distillation vessel 30. Receiver 20 allows distillation vessel 30 to be operated in a batch or continuous mode. If distillation vessel 30 is operated continuously, receiver 20 can be eliminated or used as a surge vessel.

In accordance with the process described herein, the purged reaction mixture is subjected to a simple distillation, e.g., a flash distillation, in vessel 30. While the pot temperature in vessel 30 will depend on the composition of the reaction mixture purge, the pot temperature will typically be between about 70° and about 100° C. at about 1 atmosphere pressure.

Vapors produced by the distillation in vessel 30 are removed by flow line 33 and introduced into condenser 25 where the vapors are condensed and recycled to reactor 10 by flow line 34. The high boilers, i.e., bottoms, in distillation vessel 30 are removed either periodically or continuously through flow line 32 for disposal. The boron-containing compounds in the bottoms can be destroyed through hydrolysis with 10–20 percent aqueous sodium hydroxide.

Distillate from vessel 30 recycled to reactor 10 will contain less boron-containing compounds than the reaction mixture purge because of the removal of boron-containing color bodies from the purge stream. In order to maintain the boron concentration in the reaction mixture substantially constant, additional borate ester is added to the reactor by doping the distillate (before it is introduced into the reactor) with borate ester or by increasing the rate of borate ester reactant introduced into the reactor through feed line 5 from the level present at the start of the chlorination reaction. This additional amount of borate ester (as boron) is substantially equal to the amount of boron removed from the reaction mixture purge as bottoms from distillation vessel 30.

Referring again to the drawing and in particular to stripper 40, boron trichloride and phosgene are separated from the solvent and forwarded through flow line 44 to reactor 45 where phosgene is separated from boron trichloride. Solvent is removed from the bottom of stripper 40 and recycled to absorber 35 through flow line 42. Among the art recognized methods for accomplishing the separation of phosgene and boron trichloride is the catalytic preferential destruction of phosgene, as described in U.S. Pat. No. 3,126,256. Thus in reactor 45, phosgene-containing boron trichloride is passed over an activated carbon catalyst at temperatures of between about 300° C. and about 700° C. in order to degrade phosgene to carbon monoxide and free chlorine without decomposition of the boron trichloride. The resulting gaseous products are removed from reactor 45 through flow line 48. The boron trichloride can be separated from the carbon monoxide and elemental chlorine by techniques known in the art, e.g., by condensation.

Depending on the ultimate use, reactor 45 may not be required. Thus, if the end use of boron trichloride can tolerate the level of phosgene found therein, such as less than 1.5 weight percent, e.g., 0.5 weight percent, the phosgene can be left in the boron trichloride. Alternatively, the phosgene can be recovered, e.g., by distillation, and use as a reactant in other chemical reactions, e.g., phosgenation.

It will be readily apparent to those skilled in the art that the product separations indicated in the drawing, i.e., in absorber 35 and stripper 40, are not complete and that small amounts of reaction products and solvent will be found in those streams where they are not otherwise indicated. For example, the overhead from absorber 35 will contain, in addition to carbon monoxide and hydrogen chloride, small amounts of boron trichloride, phosgene and carbon tetrachloride. Similarly, the bottoms from stripper 40 will contain small amounts of boron trichloride and phosgene in addition to carbon tetrachloride solvent.

The mole ratio of chlorine to borate ester introduced into the reactor can vary. Typically, only that amount of chlorine required to react with the borate ester reactant at reaction temperatures is used since amounts in excess of that amount add an economic burden to the process both in the loss of reactant chlorine and in the equipment required to recover or dispose of the excess chlorine. As described in copending co-assigned U.S. patent application Ser. No. 23,858 filed Mar. 26, 1979, the mole ratio of chlorine to borate ester, e.g., trimethyl borate, reactant is maintained over the period of the reaction at between 5.5:1 and about 7.5:1, preferably between about 5.75:1 and about 6.75:1. When the borate ester reactant used is chloromethyl ester of boric acid, the chlorine content of the ester is taken into account in calculating the mole ratio, i.e., in determining the total amount of chlorine that is introduced into the reactor.

The temperature at which the chlorination reaction is conducted can vary between about 20° C. and about 100° C. Typically, the reaction will be conducted between about 40° C. and about 90° C. Preferably reaction temperatures will range between about 60° C. and about 80° C., e.g., between about 65° C. and about 75° C. It has been found surprisingly that temperatures above room temperature, e.g., 40° C. and above, improve the selectivity of the reaction toward the production of carbon monoxide. Thus, at said more favorable temperatures, the amount of phosgene formed is substantially less than the amount formed at room temperature, e.g., 23° C. At temperatures less than 20° C., significant amounts of phosgene are produced.

The temperature at which the chlorination reaction is conducted will also depend on the particular solvent used, if any, for the reaction medium and the reactor pressure. It is contemplated at atmospheric pressures, the maximum reaction temperature will be determined by the boiling point of the solvent or the temperature at which the reaction mixture boils when no solvent is used. Temperatures above the boiling point of the solvent or, for example, in the upper portion of the aforesaid described temperature range, e.g., 70°–100° C. can be used when the chlorination reaction is conducted at pressures slightly above atmospheric. It is contemplated at superatmospheric pressures, temperatures in excess of 100° C., e.g., 125° C., can be used. Similarly, if reaction pressures less than atmospheric are used, the reaction temperature will be lowered accordingly.

The pressure at which the chlorination reaction is conducted is commonly less than about 3 atmospheres absolute pressure. Such moderate pressures differ significantly from the pressures attained in the chlorination process described in U.S. Pat. No. 2,943,916 wherein the reaction is conducted in a sealed tube, i.e., at autogenous pressures. It is estimated that the reactor pressure developed in the reaction described in the aforesaid patent is greater than 10 and probably is in the neighborhood of 15 to 20 atmospheres.

The chlorination reaction is more usually conducted at between about 0 and about 20 pounds per square inch gage, more typically between about 0 and 15 pounds per square inch gage (psig). Conveniently, the chlorination reaction is conducted at atmospheric or ambient pressures; however, when conducted continuously, pressures above atmospheric are used to overcome the pressure drop in equipment and piping downstream of the reactor. As indicated, reduced pressures, i.e., less than atmospheric, can also be used. Pressures as low as 200 millimeters of mercury are contemplated.

The chlorination reaction can be conducted, if desired, in a reaction medium comprising an inert liquid organic solvent. Use of a solvent assists in controlling the reaction temperature. Thus, a portion of the solvent is withdrawn as vapor from the reactor, forwarded to a reflux condenser where it is condensed and then returned to the reactor. The solvent should be chemically inert to the reactants and reaction products and preferably will be one in which the reaction products are soluble. Most preferably, the reactants and reaction product will be soluble in the solvent. As the solvent, there can be mentioned carbon tetrachloride and chlorofluorinated oils such as Halocarbon oil, Fluorolube heat exchange fluids (polymers of trifluorovinyl chloride), and polychlorinated aromatics such as 1,2,4-trichlorobenzene. Also contemplated are the analogous liquid polyhalogenated, e.g., chlorinated, fluorinated and/or brominated, aliphatic hydrocarbons of from one to four carbon atoms and aromatic hydrocarbons. Carbon tetrachloride is particularly useful as the solvent for the reason that it is chemically inert to and is a solvent for the reactants and reaction products.

The particular solvent or the amount of solvent used is not critical. Only that amount needed to solubilize the reactants and reaction products and act as a heat sink for the heat of reaction is required. Generally the weight ratio of solvent to borate ester will vary from about 1:1 to 10:1. When the chlorination reaction is conducted in the absence of an extraneous solvent, the borate ester and the intermediate compounds formed during the reaction serve as the reaction medium.

In the practice of the herein described process, the amount of phosgene coproduct formed is less than 0.6 moles per mole of borate ester, e.g., trimethyl borate, reactant. In contrast, the amount of phosgene formed in accordance with the prior art process, as described in U.S. Pat. No. 2,943,916, is about 3 moles of phosgene per mole of trimethyl borate reactant. The amount of phosgene formed in accordance with the present invention can be less than 0.2, e.g, 0.1, mole of phosgene per mole of trimethyl borate and, at most preferred conditions, the amount of phosgene formed can be reduced to less than 0.03 mole, e.g., 0.01 mole, of phosgene per mole of trimethyl borate reactant.

Various benefits accrue by reducing the amount of phosgene formed in the reaction. Firstly, the amount of chlorine wasted in the formation of such coproduct is reduced accordingly. Unless such phosgene is recovered and treated, e.g., by cracking, to recover its chlorine content, the phosgene is destroyed, e.g., by neutralization with caustic. Both alternatives result in an economic burden on the process. The latter treatment results in a net loss of chlorine. Secondly, and perhaps more importantly, the less the amount of phosgene formed in the reaction, the less phosgene that needs to be separated from the boron trichloride product.

As the boron compound reactant, there can be used the borate esters; namely, trimethyl borate, trimethoxyboroxine and chloromethyl esters of boric acid. Examples of chloromethyl esters include dimethoxy boron chloride, i.e., $(CH_3O)_2BCl$, methoxy boron dichloride, i.e., $(CH_3O)BCl_2$, and chloromethyl esters represented by the following general formulae: $B(OCH_2Cl)(OCH_3)_2$, $B(OCH_2Cl)_2(OCH_3)$, $B(OCH_2Cl)_3$, $B(OCHCl_2)(OCH_3)_2$, $B(OCHCl_2)_2(OCH_3)$, $B(OCHCl_2)_3$, $(ClCH_2O)_2BCl$, $(Cl_2CHO)_2BCl$, $(ClCH_2O)BCl_2$, and $(Cl_2CHO)BCl_2$.

The term trimethoxyboroxine is intended to mean the product obtained from the reaction of boric oxide and trimethyl borate in varying ratios. These products can be represented for convenience by the formula $B_2O_3\cdot(OCH_3)_3$. It is to be understood, however, that an excess of either boric oxide or trimethyl borate may be present, in which case the aforesaid formula may not represent the exact composition of the material.

Trimethyl borate is a commerically available material. It can be prepared by the reaction of boric oxide or boric anhydride with methanol. See, for example, Schlesinger et al, J. Am. Chem. Soc. 75, 213–215 (1953). See also U.S. Pat. Nos. 2,217,354, 2,088,935, 2,808,424, and 2,813,115 all of which relate to the aforesaid process for manufacturing methyl borate.

The boron compound, e.g., trimethyl borate, and chlorine reactants should be substantially dry for the reason that boron trichloride is readily hydrolyzed by water. Therefore, in order to prevent any unnecessary loss of boron trichloride product, the reactants, solvent, reactor and recovery equipment should be substantially anhydrous, i.e., less than 10 ppm (parts per million) water.

The above described chlorination reaction is free radical initiated and, therefore, any free radical initiator that generates free radicals at the temperature of chlorination, e.g., light or organic peroxy compounds, can be used. The amount of initiator used is not critical so long as a threshold level of free radicals are provided to initiate and maintain the chlorination reaction. Such amount is typically referred to as an initiating amount.

Any source of light which will provide the necessary useful radiation, can be used. Such radiation is generally considered to be available from near ultraviolet or barely visible light. Thus, a common household tungsten filament light bulb, sun lamp, or mercury arc lamp can be used. The quantum of radiation required is difficult to define; however, one skilled in the art can readily ascertain whether the quantum of useful radiation is adequate for the quantity of reactants used by observing whether the chlorination reaction occurs. The light source for the photochlorination can be internal (inside the reactor) or external (outside the reactor). In the latter case, means must be provided for the radiation to enter the reactor, e.g., by use of a glass reactor or a glass sight port.

In addition to photoinitiation, the chlorination reaction can be initiated chemically by an organic free radical initiator, i.e., an organic peroxy or azo compound. Examples of such compounds include diacyl peroxides, monoperoxycarbonates, dialkyl peroxydicarbonates, peroxyesters, and azo compounds. The particular free-radical initiator used is not critical provided that it is compatible with the reactants and solvent (if used), i.e., non-reactive chemically, and generates free-radicals efficiently at the chlorination temperature selected. A person skilled in the art can readily select an appropriate initiator from published half-life data, which is a means of expressing the rate of decomposition of the initiator at a particular temperature. The organic free-radical initiators should be substantially free of water, i.e., substantially anhydrous, and substantially free of materials such as solvents, oils, etc. that can be chlorinated. Typically the number of carbon atoms in each radical (alkyl, aryl or cycloalkyl) of the peroxide will vary from 2 to 12.

Examples of suitable organic free radical initiators include: diacyl peroxides such as acetyl peroxide, benzoyl peroxide, caprylyl peroxide, p-chlorobenzoyl peroxide, decanoyl peroxide, 2,4-dichlorobenzoyl peroxide, lauroyl peroxide and propionyl peroxide; peroxyesters such as t-butyl peroxyacetate, t-butyl peroxy (2-ethylhexanoate), t-butyl peroxyisobutyrate, and t-butyl peroxypivalate; dialkyl peroxydicarbonates such as diethyl, diisopropyl, di-n-propyl, di-n-butyl, di-sec-butyl, diisobutyl, di-t-butyl, dicapryl, di-2-ethylhexyl, dibenzyl, dicyclohexyl and di-4-t-butyl cyclohexyl peroxydicarbonate; monoperoxycarbonates such as t-butylperoxy isopropyl carbonate, and azo compounds such as azo-bis-isobutyronitrile.

As in the case of light, only that amount of the chemical free-radical initiator that is required to initiate and maintain the chlorination reaction need be used, i.e., an initiating amount. That amount will vary depending on the free-radical initiator used, the temperature of chlorination and the quantity of reactants. Such an amount can be determined readily by one skilled in the art. It is contemplated that for a peroxydicarbonate, such as diisopropyl peroxydicarbonate, about one weight percent, basis the borate ester, e.g., trimethyl borate, will be used. The organic free-radical initiator will be introduced into the reactor continuously for a continuous chlorination, as distinguished from a batch chlorination, so as to maintain a continuous supply of free radicals in the reaction medium.

The present invention is more particularly described in the following Examples which are intended as illustrative only since numerous modifications and variations therein will be apparent to those skilled in the art.

In the Examples which follow, a 1000 ml. stirred glass autoclave was used as the reaction vessel. This reactor was equipped with a thermocouple, stainless steel tubes for the introduction of chlorine and trimethyl borate below the surface of the reaction mixture, a dip tube through which a portion of the reactor contents could be removed, and an entrance tube for the introduction of makeup liquid. The reactor possessed a jacket through which water at 70° C. was circulated. The reaction mixture was irradiated with a 275 watt sunlamp.

Gases leaving the reactor were introduced sequentially into a water cooled condenser and solenoid valve controlled by a pressure transducer. The pressure within the reactor was maintained at 9-11 psig. Following the solenoid valve, the effluent gases were forwarded to the bottom of a packed tower (absorber) filled with carbon tetrachloride. The tower possessed a jacket through which a refrigerated, glycol-water solution (−3° C.) was circulated. Carbon tetrachloride was continuously introduced into the top of the tower at a rate identical to that at which the carbon tetrachloride solution was removed from the bottom. The solution leaving the absorber was analyzed periodically by infrared spectroscopy for boron trichloride and phosgene content. Gases not absorbed in carbon tetrachloride passed through a chilled condenser, caustic scrubber, wet test meter, and gas sampling bulb.

EXAMPLE I

The aforesaid described reaction system was flushed thoroughly with nitrogen and the reactor charged with 400 ml. carbon tetrachloride and 6.0 grams trimethyl borate. Chlorine was introduced into the reaction at an average rate of 0.83 mole/hour and trimethyl borate was introduced at a rate of 0.135 mole/hour for two hours. At that time, 50 ml. of the reaction mixture (purge material) was removed from the reactor and replaced with 50 ml. of carbon tetrachloride. This procedure was repeated once per hour for the next five hours. During this time, the trimethyl borate addition rate was held at 0.135 mole/hour, but the average chlorine addition rate was lowered to 0.72 mole/hour to compensate for the amount of borate esters being removed with the purge material. During this five hour period, the average rate of formation of each of the following products was observed to be:
boron trichloride: 0.125 mole/hour
phosgene: 0.008 mole/hour
carbon monoxide: 0.38 mole/hour
The reaction was discontinued and the slightly colored reaction mixture collected.

A portion of the reaction mixture (300 ml.) was combined with 210 ml. of the purge material, which was also slightly colored. This solution was distilled at atmospheric pressure, and 495 ml. of colorless distillate (boiling range=74°–90° C.) was collected. The distillate was found to contain a mixture of borate compounds at a total concentration of 0.23 mole/liter.

EXAMPLE II

The reaction system of Example I was flushed thoroughly with nitrogen and the reactor charged with 400 ml. carbon tetrachloride and 6.3 grams trimethyl borate. Chlorine was introduced into the reactor at an average rate of 0.84 mole/hour and trimethyl borate was introduced at an average rate of 0.14 mole/hour for ten hours. The temperature in the reactor was maintained during the run at 72° C. by holding the reactor jacket temperature at 70° C.

During the last eight hours of operation, 50 ml. of purge material was removed from the reactor once per hour and replaced with 50 ml. of the colorless distillate described in Example I. During this eight hour period, the average rate of formation of each of the following products was observed to be:
boron trichloride: 0.14 mole/hour
phosgene: 0.004 mole/hour
carbon monoxide: 0.40 mole/hour The data of Examples I and II show that distillation of a purge fraction of a trimethyl borate chlorination reaction mixture that contains color-producing compounds produces a colorless distillate. Further, recycling of this distillate to the reaction mixture does not effect the chlorination reaction—substantially identical results having been obtained with or without addition of the distillate to the reactor.

Although the present process has been described with reference to specific details of certain embodiments thereof, it is not intended that such details should be regarded as limitations upon the scope of the invention except as and to the extent that they are included in the accompanying claims.

I claim:

1. In the continuous process of producing boron trichloride wherein liquid borate ester is contacted with chlorine in the presence of a free radical initiator in a reactor at temperatures of from about 20° C. to about 100° C. and vaporous boron trichloride is removed from the reactor, the improvement which comprises removing a purge fraction of the liquid reaction mixture from the reactor, distilling liquid reaction mixture removed from the reactor, and recycling distillate obtained from the distillation to the reactor.

2. The process of claim 1 wherein the purge fraction is from about 4 to about 20 volume percent of the reaction mixture per hour.

3. The process of claim 1 wherein the purge fraction is from about 6 to about 15 volume percent of the reaction mixture per hour.

4. The process of claims 1 or 2 wherein borate ester is added to the distillate in amounts sufficient to enrich the boron content of the distillate to the boron content of the purge fraction removed from the reactor.

5. The process of claims 1, 2 or 3 wherein the borate ester is selected from the group consisting of trimethyl borate, trimethoxy boroxine, chloromethyl esters of boric acid and mixtures of such borate esters.

6. The process of claim 5 wherein the chlorination temperature is from about 40° C. to about 90° C.

7. The process of claim 1, 2, or 3 wherein the chlorination reaction is conducted in an inert liquid organic solvent.

8. The process of claim 7 wherein the free-radical initiator is light.

9. In the continuous process of producing boron trichloride wherein liquid borate ester selected from the group consisting of trimethyl borate, trimethoxyboroxine, chloromethyl esters of boric acid and mixtures of such borate estes is contacted with chlorine in the presence of a free radical initiator and an inert liquid organic solvent in a reactor at temperatures of from about 20° C. to about 100° C. and vaporous boron trichloride is removed from the reactor, the improvement which comprises continuously removing a purge fraction of the liquid reaction mixture from the reactor, distilling liquid reaction mixture removed from the reactor, and recycling distillate obtained from said distillation to the reactor, thereby avoiding the build-up of color bodies in the reaction mixture.

10. The process of claim 9 wherein the purge fraction is from about 6 to about 15 volume percent of the reaction mixture per hour.

11. The process of claim 10 wherein borate ester is added to the distillate to about the boron content of the purge fraction removed from the reactor.

12. The process of claim 9 or 10 wherein the free-radical initiator is selected from the group consisting of light, organic peroxy compound or azo-bis-isobutyronitrile.

13. The process of claim 12 wherein the chlorination reaction is conducted in an inert liquid organic solvent.

14. In the continuous process of producing boron trichloride wherein liquid trimethyl borate is contacted with chlorine in a reactor in the presence of a free-radical initiating amount of light and an inert liquid organic solvent at temperatures of from about 40° C. to about 90° C. and vaporous boron trichloride is removed from the reactor, the improvement which comprises continuously removing a purge fraction of the liquid reaction mixture from the reactor, continuously distilling liquid reaction mixture removed from the reactor, and recycling distillate obtained from the distillation to the reactor, thereby avoiding the build-up of color bodies in the reaction mixture.

15. The process of claim 14 wherein the purge fraction is from about 8 to about 12 volume percent of the reaction mixture per hour.

16. The process of claim 15 wherein the organic solvent is carbon tetrachloride.

17. The process of claim 16 wherein the reaction temperature is from about 60° C. to about 80° C. and the reactor pressure is from about 0 to about 20 pounds per square inch gage.

18. The process of claim 16 wherein make-up trimethyl borate is added to the distillate.

* * * * *